Patented May 16, 1972

3,663,530
WATER-INSOLUBLE PYRAZOLONE AZO DYESTUFFS

Jean Marie Louis Leroy, Rouen, and Claude Marie Henri Emile Brouard, Sotteville-les-Rouen, France, assignors to Ugine Kuhlmann, Paris, France
No Drawing. Filed Oct. 4, 1968, Ser. No. 765,013
Claims priority, application France, June 26, 1968, 156,564
Int. Cl. C09b 29/38, 31/14; D06p 3/00
U.S. Cl. 260—163    3 Claims

ABSTRACT OF THE DISCLOSURE

Water-insoluble dyestuffs are provided having the formula:

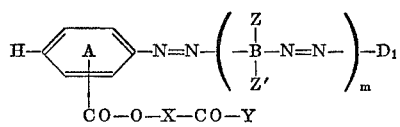

or the formula:

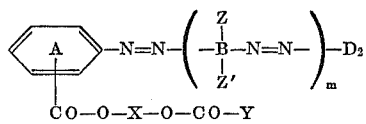

in which B represents a p-phenylene or p-naphthylene radical linked to the ntirogen atoms, $m$ represents the numbers 0 or 1, X represents an alkylene radical having up to 4 carbon atoms, Z and Z' each represent a hydrogen or halogen atom or an alkyl, alkoxy, or acylamino group having up to 4 carbon atoms, Y represents an aliphatic, arylaliphatic, aromatic or heterocyclic radical, $D_1$ represents the residue of a coupling compound of the benzene, diphenyleneoxide, indazole, coumarin, acetylacetarylide, pyrazolone or hydroxy-quinoline series, $D_2$ represents the residue of a coupling compound of the benzene, diphenylene-oxide, indazole, coumarin, acetylacetarylide, hydroxyquinoline, 1 - phenyl-3-methyl-pyrazolone or 1-phenyl-3-carbonamidopyrazolone series, the nuclei A, B, $D_1$, $D_2$ and Y containing no solubilising acid groups. These dyestuffs are useful for the colouration of hydrophobic textile materials and may be prepared from novel diazotisable bases of the general formula:

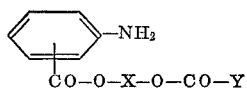

in which X, Y, Z and Z' are as defined above. The shades obtained are remarkably fast to thermal fixation, sublimation, creasing, combustion gases, overdyeing, dry cleaning, chlorine and wet tests. The reserve of natural fibres and the dischargeability are good. The fastness to light is remarkable even with light shades and the dyestuffs resist boiling and reduction at temperatures between 80° C. and 220° C.

The present invention relates to new intermediates products and to new water-insoluble mono- or disazodyestuffs, which are particularly interesting for the colouration of hydrophobic textile materials, especially textile materials based on aromatic polyesters.

These new dyestuffs may be represented by the general formulae:

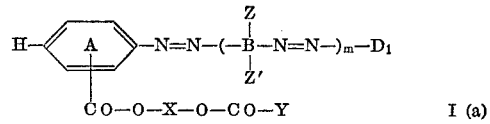
I (a)

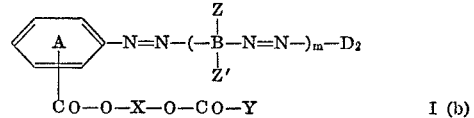
I (b)

in which B represents a paraphenylene or paranaphthylene radical linked to the nitrogen atoms, $m$ represents the number 0 or 1, X represents an alkylene radical having up to 4 carbon atoms, Z and Z' each represent a hydrogen or halogen atom or an alkyl, alkoxy, or acylamino group having up to 4 carbon atoms, Y represents an aliphatic, arylaliphatic, aromatic or heterocyclic radical, $D_1$ represents the residue of a coupling compound of the benzene, diphenylene oxide, indazole, coumarin, acetylacetarylide, pyrazolone, or hydroxyquinoline series, $D_2$ represents the residue of a coupling compound of the benzene, diphenylene oxide, indazole, coumarin, acetylacetarylide, hydroxyquinoline, 1 - phenyl-3-methylpyrazolone or 1-phenyl-3-carbonamido-pyrazolone series, the nuclei A, B, $D_1$, $D_2$ and Y containing no solubilising acid groups.

The residue Y can be, for example a methyl, ethyl, isopropyl, trifluoromethyl, acetylethyl, benzyl, 2',4'-dichloro-phenoxyethyl, styryl, phenyl, chlorophenyl, toluyl, methoxyphenyl, β-furylvinyl or pyridinyl group.

The residues $D_1$ and $D_2$ can be substituted, for example, by halogen atoms, alkyl, alkoxy, trifluoromethyl, alkylsulphonyl, alkylcarbonyl, alkoxycarbonyl, hydroxy, acylamino, N-alkyl-acylamino, aminocarbonyl, aminosulphonyl, alkylaminocarbonyl, alkylaminosulphonyl groups.

The dyestuffs of Formulae Ia and Ib in which $m$ represents zero may be prepared, for example by diazotising a base of the general formula:

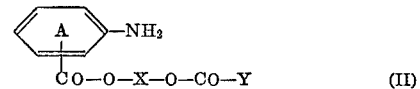
(II)

and coupling the diazo derivative with a compound $D_1H$ or $D_2H$ possessing a free coupling position, the significance of X and Y and the possible substituents of $D_1$ and $D_2$ being as defined above.

The dyestuffs of Formulae I in which $m$ is equal to 1 may be prepared, for example, by coupling the diazo derivative of a base of Formula II with an amine of formula

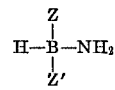

diazotising the amino-monoazo dyestuff thus obtained and coupling with a coupling compound $D_1H$ or $D_2H$.

The dyestuffs of Formula I may also be prepared by acylating dyestuffs of the formula:

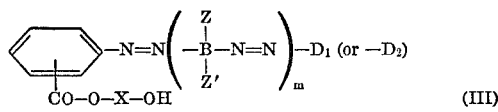
(III)

by means of an acid chloride Y—CO—Cl in the presence of an acid-absorbing agent, possibly in an inert diluent, or by means of an acid anhydride (Y—CO)₂O. This method can only be carried out, however, if the dyestuff of Formula III does not contain any other acylable group than the OH group carried by the radical X.

The bases of Formula II may themselves be prepared, for example, by the following processes:

(1) starting from a benzoyl nitrochloride
   by condensation with an acylglycol of formula

Y—CO—O—X—OH and reduction of the nitro group
   or by condensation with a glycol, acylation by means of an acid chloride Y—CO—Cl or an acid anhydride (Y—CO)₂O and reduction of the nitro group, or (2) starting from a nitrobenzoic acid
   by esterification by means of an acylglycol

Y—CO—O—X—OH and reduction of the nitro group
   by esterification by means of a glycol, acylation as before and reduction of the nitro group
   or by oxyalkylation, acylation as before and reduction of the nitro group, or (3) by trans-esterification of a methyl or ethyl nitrobenzoate with a glycol or an acylglycol

Y—CO—O—X—OH possible acylation as before, and reduction of the nitro group, or (4) by trans-esterification of a methyl or ethyl aminobenzoate with an acylglycol Y—CO—O—X—OH or (5) by esterification of an aminobenzoic acid with an acylglycol Y—CO—O—X—OH.

In view of their tinctorial applications, it is advantageous for the dyestuffs obtained to be in a finely divided state. This is why the dyestuffs according to the present invention are preferably previously dispersed and provided in the form of a paste or powder. This form may be realised by mixing the dyestuffs in the form of a paste with dispersing agents, and possibly with inert diluents. This mixing may be followed, if desired, by drying and grinding The dyestuffs thus treated can then be used for dyeing in a long or short bath, for foularding or printing.

Among the dispersing agents which may be used are for example, the products from the condensation of naphthalenesulphonic acids with formaldehyde, especially dinaphthylmethane-disulphonates, esters of sulphonated succinic acid, alkali metal salts of the sulphuric esters of fatty alcohols, for example sodium lauryl sulphate, lignosulphonates, soaps, alkali metal salts of the sulphuric esters of monoglycerides of fatty acids, the products obtained by condensation of the cresols with formaldehyde and naphthosulphonic acids, the condensation products of 4,4'-dihydroxy-diphenylsulphone with formaldehyde and alkali metal bisulphites.

The dyeing of polyester fibres can be carried out in the presence of a carrier at temperatures ranging from 80° C. to 125° C. or without a carrier under pressure at between 100° C. and about 140° C.

They can also be foularded or printed with an aqueous dispersion of the new dyestuffs, and the impregnation obtained fixed at between 140° C. and 230° C., for example by means of steam, air or by contact with a heated surface. The range of temperature between 180° C. and 200° C. is particularly favourable since the dyestuffs diffuse rapidly into the polyester fibres and do not sublime even if the action of these high temperatures is prolonged. This enables clogging or fouling of the dyeing apparatus to be avoided.

Cellulose diacetate is preferably dyed by exhaustion at between 65° C. and 85° C. and cellulose triacetate and the polyamide fibres are preferably dyed at temperatures up to 115° C. The most favourable range of pH is between 2 and 9 and especially between 4 and 8. The triacetate and the polyamide fibres can be foularded or printed, like the polyester fibres, with an aqueous suspension of the new dyestuffs and the impregnations obtained fixed at between 140° C. and 210° C.

In foularding or printing, the usual thickeners may be used, for example, modified or non-modified natural products such as the alginates, crystalline gum, carob, gum tragacanth, carboxymethylcellulose, hydroxyethylcellulose, starch or synthetic products such as polyacrylic amides or polyvinyl alcohols.

The shades thus obtained are remarkably fast to thermal fixation, sublimation, creasing, combustion gases, overdyeing, dry cleaning, chlorine and wet tests, for example, water, washing and sweat. The reserve of the natural fibres, especially of wool and cotton, and the dischargeability are good. The fastness to light is remarkable even with light shades, so that the new dyestuffs are very suitable for the production of fashion shades. The dyestuffs resist boiling and reduction at temperatures between 80° C. and 220° C. This stability is not altered by the bath ratio nor by the presence of dyeing accelerators.

The new dyestuffs can also be used for dyeing polyolefine fibres, fibres based on polymers or copolymers of acrylonitrile or based on polyvinyl derivatives.

Certain dyestuffs of Formula I lend themselves to the colouration in bulk of varnishes, oils, synthetic resins and synthetic fibres spun from their solutions in organic solvents. Some of these dyestuffs are also remarkably adapted to the dyeing of synthetic fibres modified by a metal, for example, nickel polyolefine fibres.

The invention is illustrated by, but not limited to, the following examples in which the parts are parts by weight unless the contrary is indicated.

EXAMPLE 1

205.1 parts of the potassium salt of para-nitrobenzoic acid are mixed with 120 parts of glycol chlorhydrin and the mixture is heated under reflux until condensation is complete. 196 parts of ethylene glycol p-nitrobenzoate (M.P. 76–76.5° C.) are obtained which is heated under reflux in 112 parts of acetic anhydride. When the reaction is finished, the β-acetyloxyethyl ester of the p-nitrobenzoic acid is isolated in a mixture of water and ice. It melts at 71° C. (73° C. after recrystallisation from a mixture of water and alcohol).

*Analysis.*—Calculated (percent): C, 52.17; H, 4.34; N, 5.53. Found (percent): C, 52.92; H, 4.67; N, 5.58.

By reduction of this ester, for example by the Béchamp method, the β-acetyloxyethyl ester of p-aminobenzoic acid is obtained which melts at 94° C. When recrystallised from a mixture of water and methyl alcohol, this product melts at 96–97° C.

*Analysis.*—Calculated (percent): C, 59.19; H, 5.83; N, 6.28. Found (percent): C, 59.13; H, 6.19; N, 6.29.

EXAMPLE 2

105 parts of ethylene glycol p-nitrobenzoate obtained as in Example 1 are added to 150 parts of xylene and 75 parts of diethylaniline. The mixture is heated to 60° C. and 83.25 parts of cinnamoyl chloride are introduced. When the reaction is finished, the mixture is run into water and the β-cinnamoyloxyethyl ester of the p-nitrobenzoic acid is filtered off and dried. It melts at 93–94° C.

By reduction of this ester in a neutral or acid medium, the β-cinnamoyloxyethyl ester of p-aminobenzoic acid is obtained, which when recrystallised from methyl alcohol melts at 152° C.

*Analysis.*—Calculated (percent): C, 69.23; H, 5.76; N, 4.48. Found (percent): C, 69.13; H, 5.44; N, 4.60.

Prepared in an identical way, the β-benzoyloxyethyl ester of p-aminobenzoic acid melts at 134–135° C.

*Analysis.*—Calculated (percent): C, 67.36; H, 5.27; N, 4.91. Found (percent): C, 67.10; H, 5.88; N, 5.07.

EXAMPLE 3

50 parts of [4-β-hydroxyethoxycarbonyl-benzene]-<1 azo 4>-[1 - phenyl - 3 - methyl-5-hydroxy-pyrazole] are heated for 2 hours under reflux with 200 parts of acetic anhydride. A part of the acetic acid formed and the excess anhydride is driven off and the product is left to crystallise and the crystals are filtered off. The crystallisation can be accelerated by adding alcohol or petrol ether. The paste of dyestuff obtained is then mixed with a dispersing agent, for example a cresol-formaldehyde-naphtholsulphonic acid condensation product and used as such or after drying.

When applied on polyester fibres, for example by means of a dyebath at about 100° C. with the addition of a carrier, or at high temperature between 120° C. and 140° C. or by printing, foularding and thermal fixation, the acetyl derivative gives a yellow shade having excellent fastness to light and sublimation.

EXAMPLE 4

111.5 parts of the β-acetoyloxyethyl ester of p-aminobenzoic acid are dissolved in 1000 parts of water and 110 parts by volume of 30% hydrochloric acid and are diazotised by adding 35 parts of sodium nitrite. The solution of the diazo derivative is introduced into a solution of 105 parts of 1-phenyl-3-carbon-amido-5-pyrazolone in 2000 parts of water containing 120 parts of sodium carbonate and 200 parts of sodium acetate. The dyestuff obtained is isolated in the conventional manner, mixed with a dispersing agent and if desired dried. It dyes polyester fibres a yellow shade possessing excellent general fastness, particularly to light and sublimation.

On replacing the 1-phenyl-3-carboamido-5-pyrazolone in Example 4 by the coupling compounds enumerated in the following Table A other monoazo dyestuffs are obtained of which the shade on polyester fibres is indicated in the third column.

TABLE A

| Example | Coupling compound, $D_1H$ or $D_2H$ | Shade on polyester |
|---|---|---|
| 5 | 1-phenyl-3-methyl-5-pyrazolone | Yellow. |
| 6 | 2',5'-dichloro-1-phenyl-3-methyl-5-pyrazolone. | Greenish yellow. |
| 7 | 3-methyl-5-pyrazolone | Do. |
| 8 | 3'-sulphonamido-1-phenyl-3-methyl-5-pyrazolone. | Yellow. |
| 9 | 3'-nitro-1-phenyl-3-methyl-5-pyrazolone. | Do. |
| 10 | 1-hydroxyethyl-3-methyl-5-pyrazolone. | Do. |
| 11 | 1-phenyl-3-N-ethylcarbonamido-5-pyrazolone. | Do. |
| 12 | 2,4-dihydroxy-quinoline | Greenish yellow. |
| 13 | N-hydroxyethyl-4-hydroxy-2-quinolone. | Do. |
| 14 | N-methyl-4-hydroxy-2-quinolone. | Do. |
| 15 | N-ethyl-N-cyanoethyl-aniline | Reddish yellow. |
| 16 | Ethyl ester of N-ethyl-N-(3-methyl-phenyl)-aminopropionic acid. | Yellow orange. |
| 17 | N,N-bis-(cyanoethyl)-metatoluidine | Yellow. |
| 18 | N-methyl-N-cyanoethyl-metatoluidine. | Yellow orange. |
| 19 | 4-dimethylamino-2-acetylaminobenzene. | Orange. |

TABLE A.—Continued

| Example | Coupling compound, $D_1H$ or $D_2H$ | Shade on polyester |
|---|---|---|
| 20 | 4-dimethylamino-2-cinnamoylamino-benzene. | Orange. |
| 21 | N-ethyl-N-acetyloxyethyl-aniline | Reddish yellow. |
| 22 | 1,1-dioxide of N-phenyl-1,4-tetrahydrothiazine. | Yellow. |
| 23 | N-ethyl-N-hydroxyethyl-aniline. | Orange. |
| 24 | N-cyanoethyl-N-acetyloxyethylaniline. | Yellow. |
| 25 | N-cyanoethyl-tetrahydroquinoline. | Do. |
| 26 | Para-cresol | Do. |
| 27 | Ethyl cyanacetate | Do. |
| 28 | Phenol | Do. |
| 29 | 2-hydroxy-5-sulphonamido-naphthalene. | Yellow orange. |
| 30 | 2-amino-6-methylaminosulphonyl-naphthalene. | Orange. |
| 31 | 3-hydroxy-diphenylene-oxide | Brown orange. |
| 32 | 2-hydroxy-carbazole | Do. |
| 33 | 7-hydroxy-coumarin | Yellow. |
| 34 | 1-hydroxy-4-sulphonamido-naphthalene. | Yellow brown. |
| 35 | 2-hydroxy-3-carbonamido-naphthalene. | Red orange. |
| 36 | 2-hydroxy-N-(2'-methoxy-phenyl)-3-carbonamido-naphthalene. | Yellow. |
| 37 | 6-hydroxy-indazole | Yellow orange. |
| 38 | 8-hydroxy-quinoline | Brown on nickel polypropylene. |

On operating as in Example 4 from diazotisable bases and coupling compounds indicated in Table B below, other monoazo dyestuffs are obtained of which the shades on polyester fibres are indicated in the last column.

TABLE B

| Example | Diazotisable base | Coupling compound, $D_1H$ or $D_2H$ | Shade on polyester |
|---|---|---|---|
| 39 | β-Cinnamoyloxyethyl ester of p-aminobenzoic acid | 1-phenyl-3-methyl-5-pyrazolone | Yellow. |
| 40 | β-(phenylacetylocy)ethyl ester of p-aminobenzoic acid | do | Do. |
| 41 | β-[(2',4'-dichloro-phenoxy)-acetyloxy]ethyl ester of p-aminobenzoic acid | do | Do. |
| 42 | β-Benzoyloxyethyl ester of p-aminobenzoic acid | do | Do. |
| 43 | β-Acryloyloxyethyl ester of p-aminobenzoic acid | do | Do. |
| 44 | β-Acetyloxyethyl ester of m-aminobenzoic acid | do | Do. |
| 45 | γ-Acetyloxypropyl ester of p-aminobenzoic acid | do | Do. |
| 46 | β-Acetyloxyethyl ester of anthranilic acid | N-methyl-4-hydroxy-2-quinolone | Greenish yellow. |
| 47 | do | 1-phenyl-3-ethoxy-carbonyl-5-pyrazolone. | Yellow. |
| 48 | do | 1-phenyl-3-carbonamido-5-pyrazolone | Do. |

EXAMPLE 49

111.5 parts of the β-acetyloxy-ethyl ester of p-aminobenzoic acid are diazotised as in Example 4 and the solution of the diazo derivative is introduced into a solution of 61.5 parts of m-anisidine dissolved in 100 parts of 30% hydrochloric acid and 1000 parts of water. The coupling is finished by the addition of 250 parts of sodium acetate, the mixture is filtered and the precipitate obtained is made into a paste in 5000 parts of water, 200 parts of 30% hydrochloric acid are added and the amino-azo compound is diazotised by means of 35 parts of sodium nitrite.

The solution of the diazo derivative is introduced into 87 parts of 1-phenyl-3-methyl-5-pyrazolone dissolved in 2000 parts of water by means of 20 parts of caustic soda and 200 parts of sodium carbonate. The dyestuff obtained is isolated by filtration and mixed with a dispersing agent and dried if desired. It dyes polyester or triacetate fibres a reddish orange shade possessing excellent general fastness, especially to light and sublimation.

Table C below groups together other examples of disazo dyestuffs prepared as in Example 49 by diazotising the β-acetyloxyethyl ester of p-aminobenzoic acid, coupling with an amino coupling compound H—B—$NH_2$, diazotising the monoazo dyestuff and coupling with a coupling compound $D_1H$ or $D_2H$.

TABLE C

| Example | 1st coupling compound HB—NH$_2$ | Final coupling compound D$_1$H or D$_2$H | Shade on polyester |
|---|---|---|---|
| 50 | m-Anisidine | 1-phenyl-3-ethoxycarbonyl-5-pyrazolone | Scarlet. |
| 51 | do | 1-phenyl-3-carbonamido-5-pyrazolone | Do. |
| 52 | m-Toluidine | 1-phenyl-3-ethoxycarbonyl-5-pyrazolone | Orange. |
| 53 | do | 1-phenyl-3-carbonamido-5-pyrazolone | Red orange. |
| 54 | do | 2-hydroxy-3-carbonamido-toluene | Orange. |
| 55 | do | 1-phenyl-3-methyl-5-pyrazolone | Do. |
| 56 | m-Anisidine | Phenol | Yellow orange. |
| 57 | do | 2-hydroxy-3-carbonamido-naphthalene | Bluish red. |
| 58 | do | 1-hydroxy-3-carbonamido-toluene | Yellow. |
| 59 | do | N-methyl-4-hydroxy-2-quinolone | Orange. |
| 60 | 2-methoxy-5-methyl-aniline | Phenol | Do. |
| 61 | 2,5-dimethoxy-aniline | 1-phenyl-3-methyl-5-pyrazolone | Red. |
| 62 | do | Phenol | Scarlet. |
| 63 | a-Naphthylamine | o-Cresol | Brown orange. |
| 64 | do | 1-phenyl-3-methyl-5-pyrazolone | Do. |
| 65 | do | a-Naphthol | Violet. |
| 66 | do | 2-hydroxy-3-carbonamido-toluene | Orange. |
| 67 | N-acetyl-m-phenylene-diamine | 1-phenyl-3-carbonamido-5-pyrazolone | Scarlet. |

EXAMPLE 68

An ethylene glycol polyterephthalate fabric is impregnated by foularding with a bath which contains per 1000 parts, 9.0 parts of the dyestuff obtained in Example 14, 0.5 part of a polyglycol ether of oleyl alcohol, 1.5 parts of a polyacrylic amide and the quantity of water necessary to make up to 1000 parts. After drying, the fabric is subjected to thermal fixation for 1 minute at 200° C. and then to a reducing treatment with sodium dithionite. A greenish yellow shade having good fastness to light and sublimation is obtained.

EXAMPLE 69

An ethylene glycol polyterephthalate fabric is printed with a printing paste which contains, per 1000 parts, 20 parts of the dyestuff described in Example 51, 150 parts of the sodium salt of a sulphonated castor oil, 600 parts of a thickener and 250 parts of water. After drying, the fabric is subjected to thermal fixation for one minute at 200° C., and then to a reducing treatment. A scarlet shade having good fastness to light and sublimation is obtained.

EXAMPLE 70

100 parts of a cellulose triacetate fabric is introduced at 60–70° C. in a dyebath of 3000 parts which contains 1 part of the dyestuff described in Example 4 and 15 parts of o-phenyl-phenol. The bath is brought to the boil in a period of half an hour and dyeing is continued at the boil for an hour. After finishing treatment, a yellow shade of excellent fastness to light and sublimation is obtained.

We claim:

1. A water-insoluble dyestuff free from solubilising acid groups and having one of the formulae

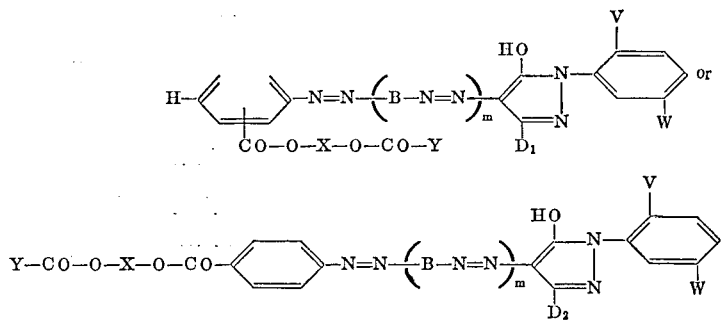

in which $m$ represents number 0 or 1, X represents the ethylene or propylene, Y is methyl, vinyl, phenyl, benzyl, styryl or 2,4-dichlorophenoxymethyl, B represents p-phenylene or p-naphthylene or p-phenylene substituted by one acetylamino or by one or two methyl or methoxy, D$_1$ is methyl, carbonamido or ethoxycarbonyl, D$_2$ is methyl, carbonamido or ethylaminocarbonyl, V is hydrogen or chlorine, and W is hydrogen, chlorine, nitro or sulphonamido.

2. The dyestuff of the formula:

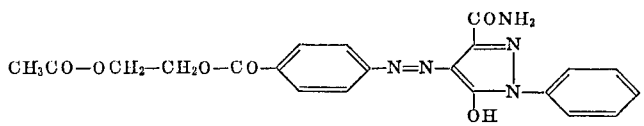

3. The dyestuff of the formula

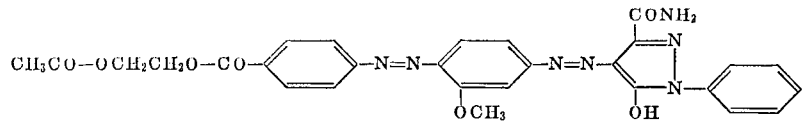

(References on following page)

References Cited

UNITED STATES PATENTS

| | | | |
|---|---|---|---|
| 2,044,329 | 6/1936 | Raeck et al. | 260—155 |
| 2,283,326 | 5/1942 | Felix et al. | 260—163 |
| 2,606,898 | 8/1952 | Salvin et al. | 260—187 |
| 3,097,198 | 7/1963 | Fishweik et al. | 260—207.1 |
| 3,190,874 | 6/1965 | Skoultchi et al. | 260—207.1 X |
| 3,190,875 | 6/1965 | Skoultchi et al. | 260—207.1 X |
| 3,222,352 | 12/1965 | Monagle | 260—157 |
| 3,324,105 | 6/1967 | Hanke et al. | 260—163 X |
| 3,325,469 | 6/1967 | Berrie et al. | 260—163 X |
| 3,483,182 | 12/1969 | Sugiyama et al. | 260—163 |

FLOYD D. HIGEL, Primary Examiner

U.S. Cl. X.R.

106—288 Q; 117—138.8 R, 138.8 B; 260—152, 155, 156, 157, 160, 162, 174, 178, 185, 187, 197, 206, 207, 207.1, 310 A, 471 R